Dec. 1, 1942.    G. B. SAYRE    2,303,957
POWDER CONVEYER
Filed Aug. 3, 1940    4 Sheets-Sheet 1

INVENTOR
GORDON B. SAYRE
BY *James and Franklin*
ATTORNEYS

Dec. 1, 1942.   G. B. SAYRE   2,303,957
POWDER CONVEYER
Filed Aug. 3, 1940   4 Sheets-Sheet 3

INVENTOR
GORDON B. SAYRE
BY *James and Franklin*
ATTORNEYS

Dec. 1, 1942.  G. B. SAYRE  2,303,957
POWDER CONVEYER
Filed Aug. 3, 1940  4 Sheets-Sheet 4

INVENTOR
GORDON B. SAYRE
BY James and Franklin
ATTORNEYS

Patented Dec. 1, 1942

2,303,957

UNITED STATES PATENT OFFICE 2,303,957

POWDER CONVEYER

Gordon B. Sayre, Boonton, N. J., assignor to Boonton Molding Company, Boonton, N. J., a corporation of New Jersey Application August 3, 1940, Serial No. 350,935

16 Claims. (Cl. 198—102)

This invention relates to conveyers for elevating or for horizontally conveying powder, particularly molding powder for the molding of plastics.

The primary object of my invention is to generally improve conveyers, especially chain conveyers.

A more particular object is to provide a conveyer capable of handling molding powders. Ordinary molding powders such as the synthetic resins or condensation products of phenol or urea are infusibly thermosetting. The potentially reactive powder tends to react and set when rubbed between sliding surfaces. Chain conveyers as heretofore constructed have been provided with buckets, paddles or other equivalent, and have been characterized by numerous sliding surfaces in the links of the chain itself, as well as between the chain and the trough or conduit within which it operates. None of these conveyers can be successfully employed with molding powders because of the tendency mentioned above for the powder to react when rubbed between sliding surfaces. The reactive powder forms an adherent film which builds up to a substantial growth, with concomitant increase in friction and ultimate locking of the entire mechanism.

Accordingly, the main object of the present invention is to overcome the foregoing difficulties, and to provide a conveyer which may be successfully employed for molding powder. For this purpose, I have devised a chain conveyer which is devoid of buckets, paddles or equivalent, and which is substantially devoid of sliding surfaces or bearings. The links of the chain are preferably made of simple round wire bent to appropriate shape, and characterized by very open and loose connections which are incapable of trapping or confining any of the powder.

A common commercially available chain of this character is that known as a "ladder chain." I have found that such a chain may be used within a loosely fitting or large-clearance tube for the rapid and efficient transfer of the powder. This is directly contrary to normal expectation, for such a chain loosely received within a substantially larger tube and devoid of buckets, paddles or the like, would be expected either not to pump at all, or to pump only a very small amount of powder in a very inefficient way. As a matter of fact, when first starting up the conveyer, its action is substantially as expected, there being a slow and gradual building up of powder by the chain within the tube. This slow preliminary action I call "priming." However, when the weight of the powder in the tube increases to a sufficient amount, the operation changes abruptly and markedly, for the powder then begins to move with the chain as a solid rod through the tube, so that the conveyer operates at maximum capacity. This operation depends on differential friction, the friction between the mass of powder and the smooth inside of the tube becoming less than the friction required for movement of the chain through the powder.

Other objects of the invention are to design a conveyer of this character for vertical movement or elevation of powder; to design a conveyer for horizontal movement of powder; to design a conveyer for both vertical and horizontal movement, the vertical and horizontal conveyers having a common transfer head; to facilitate efficient transfer of the powder from one conveyer to the other at the transfer head; to provide conveyers with multiple chains for increased capacity; to provide means for appropriately adjusting the tension on the conveyer chains; to provide a supply hopper for supplying powder to the conveyer; and to provide automatic alarm means for signalling if the supply of powder to the hopper stops.

To the accomplishment of the foregoing and other objects which will hereinafter appear, my invention consists in the chain conveyer elements and their relation one to the other, as hereinafter are more particularly described in the specification and sought to be defined in the claims. The specification is accompanied by drawings in which:

Figures 1, 2, 3, 4, 5:
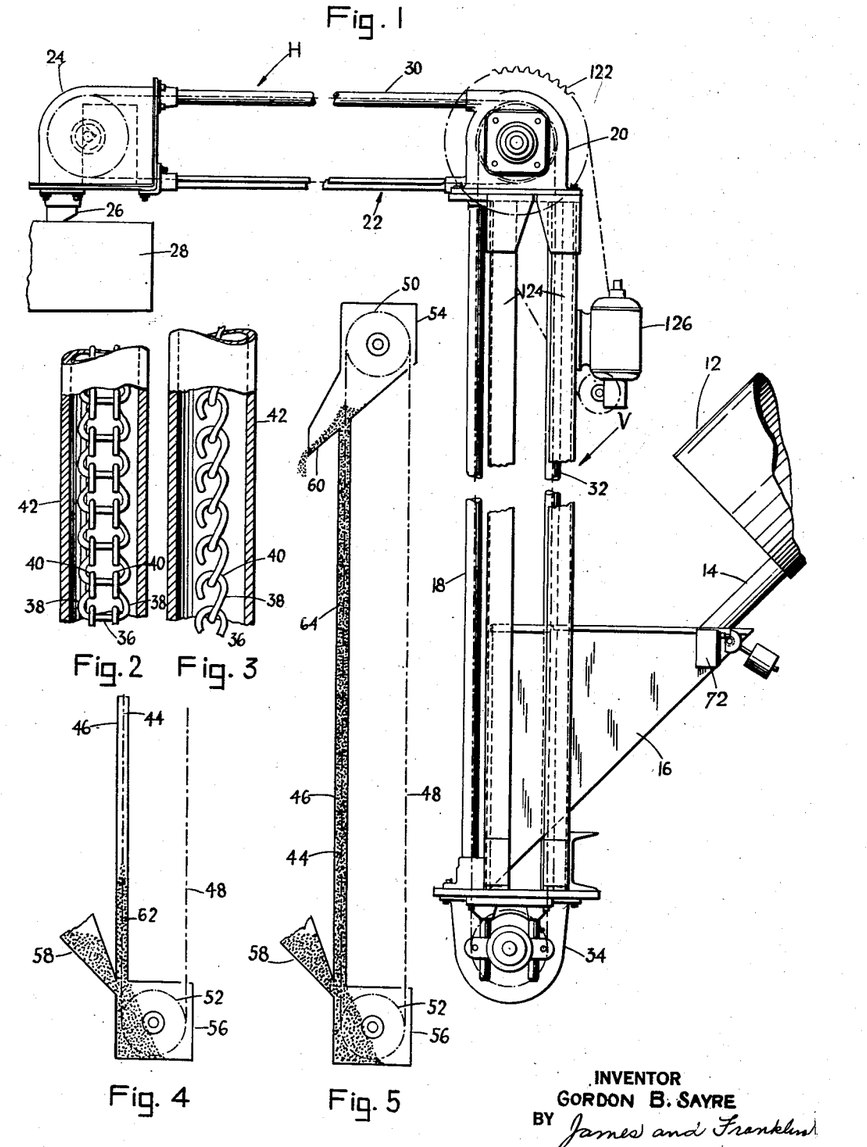
Fig. 1 is a side elevation of a vertical and horizontal conveyer embodying features of my invention.
Fig. 2 is a partially sectioned elevation of a piece of the conveyer tube and chain, drawn to enlarged scale.
Fig. 3 is a partially sectioned side elevation of the same.
Figs. 4 and 5 are schematic views explanatory of the operation of the conveyer.

Referring to the drawings, and more particularly to Fig. 1, the particular conveyer here illustrated, comprises a vertical conveyer generally designated V, and a horizontal conveyer generally designated H. Molding powder flows in a continuous stream from a barrel 12 through a spout 14 into a hopper 16 which in turn feeds the powder to the up tube 18 of conveyer V. The powder is transferred to the horizontal conveyer H at a suitable and preferably enclosed transfer head 20 from which the powder is conveyed in outgoing tube 22 to a preferably enclosed discharge head 24. The powder is discharged through a suitable spout 26 into an elevated mixing box or/and hopper 28. This may, for example, form a part of a powder measurer in a fully automatic molding machine disclosed and claimed in my co-pending application Serial Number 307,268, filed December 2, 1939, and entitled "Automatic molding apparatus." The return sides of the chains are preferably also enclosed, as by means of tubes 30 and 32. Inasmuch as the tubes 22 and 30 extend between the enclosed heads 20 and 24, while the tubes 18 and 32 extend between the enclosed supply head 34 and the transfer head 20, the entire conveyer system is enclosed and leak-proof.

It will be understood that the vertical conveyer V includes an endless chain passing through the tubes 18 and 32, and preferably supported on and driven by sprocket wheels housed within the supply and transfer heads 34 and 20, and similarly, that the horizontal conveyer H includes an endless chain passing through the tubes 22 and 30, and supported on and guided by sprocket wheels rotatably carried in the transfer and discharge heads 20 and 24. The chain employed for this purpose is devoid of buckets, paddles or the like, and is preferably formed of links bent to shape out of simple round wire stock, the links preferably being so loosely or openly interconnected that there are no sliding surfaces and no pockets within which powder may be permanently trapped. An already-known and commercially available chain for this purpose is the so-called "ladder chain," the nature of which will be clear from inspection of Figs. 2 and 3 of the drawings. Each link of the chain comprises a short length of wire bent to form a cross-bar 36, arms 38 and loops or hooks 40. The hooks 40 are much larger in radius than the cross-bars 36, and the contact therebetween is substantially a point rather than a surface contact. In any case, the mesh or construction of the chain is so open as not to trap molding powder nor to rub the same between sliding surfaces of any appreciable area.

The chain passes through and cooperates with a surrounding tube 42. The internal diameter of the tube is appreciably or even substantially greater than the maximum transverse dimension of the chain. There is no need for contact between the chain and the tube, and in fact, clearance is preferably provided in approximately the proportions shown in the drawings.

It might be thought that such a construction would not transfer any appreciable quantity of powder, but, contrary to expectation, I find that the conveyer action is a very rapid and efficient one. My explanation of the pump action is next given with particular reference to Figs. 4 and 5 of the drawings. In those figures, the up chain 44 runs within a tube 46. The down chain 48 is open. The chain is supported and driven by sprocket wheels 50 and 52 respectively carried within housings 54 (Fig. 5) and 56. A supply funnel or hopper 58 leads to conveyer tube 46 or/and a supply housing 56. A discharge spout 60 extends downwardly from the housing 54.

Referring now to Fig. 4, a quantity of molding powder is poured into the supply funnel 58, and flows around the upwardly moving chain 44. A slight quantity of powder is carried upwardly with the chain, thereby gradually building up a column of powder 62 in the tube 46. At this time the action of the conveyer is slow and inefficient, and probably corresponds to what might be expected when using an open chain of this character within an oversized tube. However, after a suitable head of powder has been built up, a solid mass or rod of powder begins to move upwardly with the chain. This is illustrated in Fig. 5, in which the column or rod of powder 64 is moving upwardly with chain 44. The slow preliminary action of the conveyer may be referred to as "priming" the conveyer. At this time the powder around the walls of tube 46 remains stationary, and the chain moves through a substantially stationary column of powder, a little powder being carried upwardly at the center by the chain, this powder being added to the top of the column. When the true conveyer action begins, however, the entire column of powder moves bodily upwardly with the chain, the powder sliding along the smooth inside wall of tube 46. The action may be explained, I believe, on the theory of differential friction, for after the conveyer has been primed, the friction between the chain and the column of powder becomes greater than the friction between the column of powder and the tube. It will be understood that this theory is offered solely by way of explanation, and not in limitation of the invention, and the latter may, if desired, be considered as an empirical discovery.

Figures 6, 7, 8:
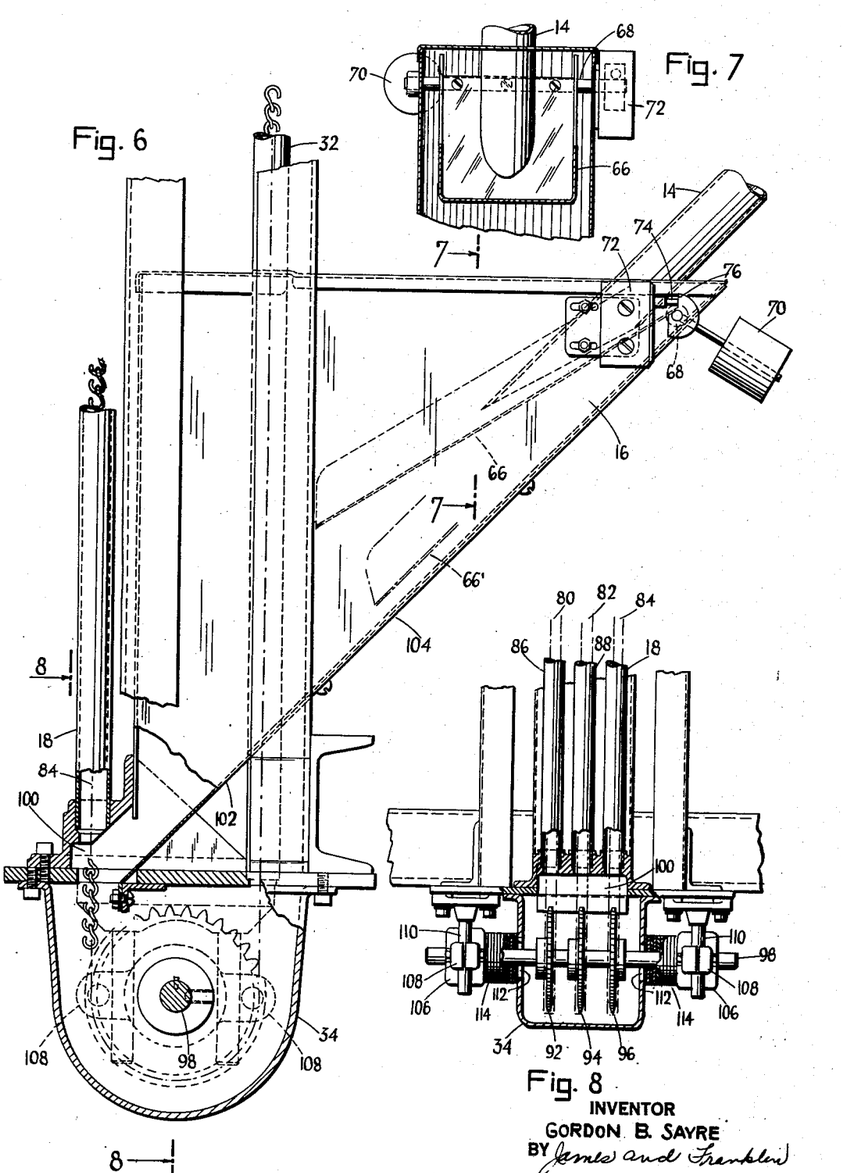
Fig. 6 is a partially sectioned side elevation of the supply head and hopper.
Fig. 7 is a section taken in the plane of the line 7—7 of Fig. 6.
Fig. 8 is a section taken in the plane of the line 8—8 of Fig. 6.

In connection with Fig. 1, it was mentioned that the powder runs from the powder barrel 12 through a tube 14 to supply hopper 16. Referring now to Figs. 6, 7 and 8, it will be seen that the tube 14 first discharges upon an open tray 66 disposed within hopper 16 and pivotally mounted at 68. The tray normally tends to rise because of a counterweight 70 connected to the pivot pin 68 carrying the tray. When powder runs from tube 14 onto the tray 66, it adds to the weight of the tray, and the latter falls to the lowered position indicated at 66' in Fig. 6. If, however, the supply of powder to the tray stops, as, for example, upon emptying of the powder barrel 12 (Fig. 1), the tray rises. The resulting movement is employed to control the operation of a suitable alarm signal. Specifically, a microswitch 72 is mounted at the side of the hopper 16, and its plunger 74 is disposed in the path of movement of an arm or cam 76 fixed on pin 68. When tray 66 rises, the switch plunger 74 moves to the right, thereby changing the position of the switch, and this change is utilized in any desired manner to close an electrical circuit to a suitable alarm such as a bell, a red lamp, or the like.

When using ordinary inexpensive commercially available ladder chain, the maximum chain size is limited. To increase the capacity of the conveyer, a number of chains may be operated in parallel. In the present case, the vertical conveyer has three chains 80, 82 and 84 (Fig. 8) operating within three collaterally disposed tubes 86, 88 and 18, and running upon three sprocket wheels 92, 94 and 96, all mounted on a common shaft 98. The tubes terminate at and the chains run through a small chamber 100.

Reverting now to Fig. 6, the powder in hopper 16 is guided to the chamber 100, and is there carried upward by the chain 84 (a small amount of powder preliminarily flowing downwardly into the supply housing 34). In the present case, it so happens that the powder barrel 12 (Fig. 1) is to be located on the down rather than the up side of the conveyer. In such case, the hopper 16 simply passes around and surrounds the down tubes of the conveyer, one of which is shown at 32. In other words, the three down tubes pass through the hopper and pass through the bottom wall of the hopper. For the sake of detachability and access, the bottom wall is preferably made of two parts, the part 102 having three open slots pointing upwardly, and the part 104 having three open slots pointing downwardly, the slotted parts overlapping at the down tubes. Suitable felt washers may be provided around the tubes to prevent leakage of powder from the hopper.

The sprocket wheel shaft 98 is carried in bearings 106 which, as here illustrated, are located outside of the supply housing 34, the bearings having split clamps 108 which are tightened on studs 110, thus making it possible to vertically adjust the position of shaft 98. The walls of housing 34 are slotted at 112 to accommodate a small amount of vertical movement. Leakage through the slots is prevented by packing the shaft with suitable packing rings 114 made of felt or the like. The amount of vertical adjustment needed is small, and may be reduced to the equivalent of a single link of chain, because for any large change, it is merely necessary to remove or add links to the chain.

Figure 9:
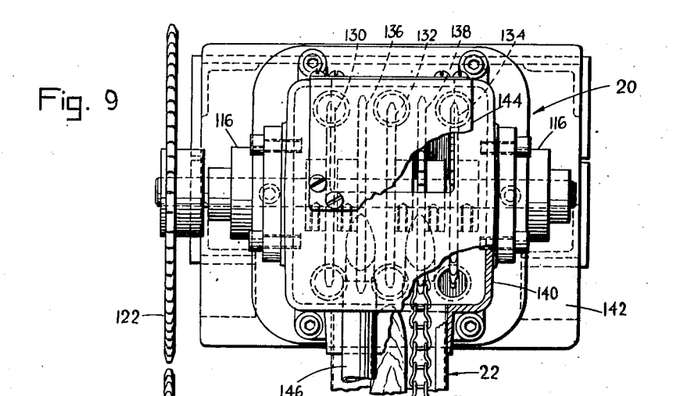
Fig. 9 is a partially sectioned plan view of the transfer head.
Figure 10:
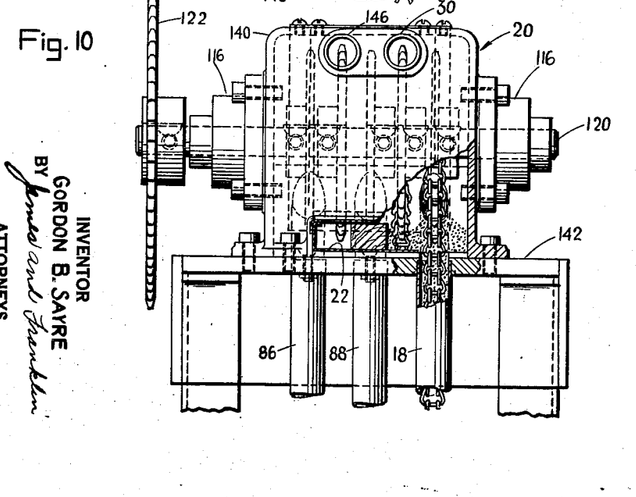
Fig. 10 is a partially sectioned front elevation of the same.
Figure 11:
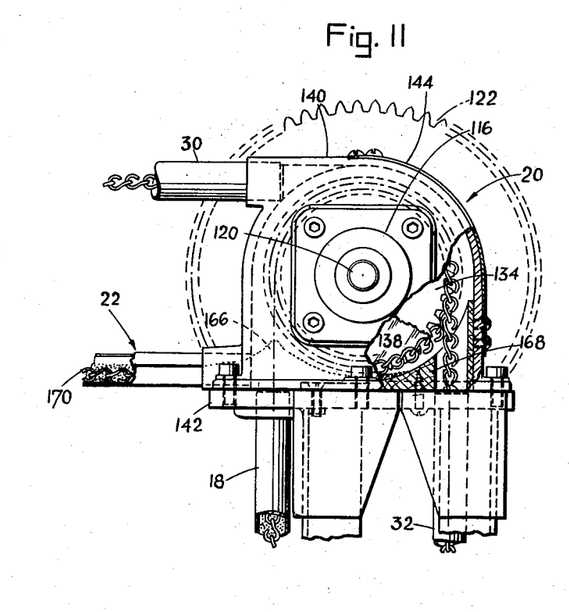
Fig. 11 is a partially sectioned side elevation of the same.

Referring now to Figs. 9, 10 and 11, the transfer head 20 comprises bearings 116 carrying a shaft 120. Shaft 120 carries sprocket wheels for both the vertical and horizontal conveyers. It is therefore convenient, although not essential, to drive the conveyers at this point, and shaft 120 is accordingly provided with a suitable pulley or wheel, in this case a sprocket wheel 122. This in turn is driven through a suitable chain 124 (Fig. 1) by a motor 126.

In the present apparatus, the horizontal movement of the powder is taken care of in two horizontal conveyers, which may most conveniently be disposed between the three vertical conveyers. Thus the shaft 120 carries five sprocket wheels. The sprocket wheels 130, 132 and 134 drive the vertical chains, while the sprocket wheels 136 and 138 drive the horizontal chains. The sprocket wheels may be alike, but for reasons subsequently pointed out, I prefer to make the sprocket wheels 136 and 138 slightly larger in diameter than the others.

The transfer head comprises a hollow upper housing 140 the open bottom of which is closed by a suitable bottom plate 142. A removable cover plate 144 may be provided for inspection.

The up tubes 86, 88 and 18, as well as the corresponding down tubes including the down tube 32, have their upper ends received in bottom plate 142. The tubes of the horizontal conveyer are received in appropriate sockets or connections formed in the housing 140. In the present case, there are two circular openings for horizontal tubes 146 and 30, and a rectangular opening for a rectangular tube or channel 22. The latter is employed in lieu of round tubes in order to increase the cross-sectional area of the horizontal conveyer, so that the two horizontal conveyers will be able to handle the delivery of the three vertical conveyers.

Figure 14:
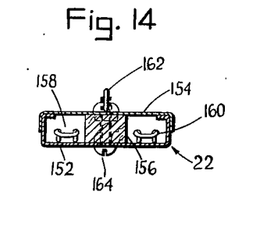
Fig. 14 is a section through the lower conveyer tube, taken approximately in the plane of the line 14—14 of Fig. 12.
Figure 15:
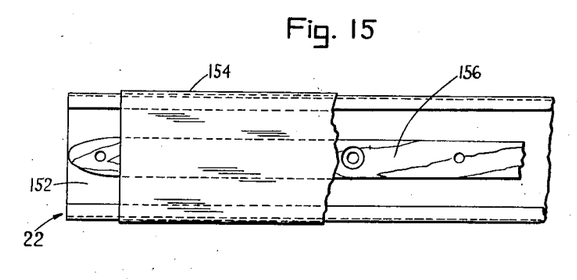
Fig. 15 is a plan view of a part of the lower conveyer tube with a part of the cover plate broken away.

The construction of the rectangular channel 22 is more clearly shown in Figs. 14 and 15, referring to which it will be seen that there is a bottom channel 152 closed by a top or cover 154, the resulting conduit being partitioned by a wood strip 156. The channel and cover are secured together by wing nuts 162 (Figs. 12 and 14) and bolts 164 passing through strip 156 so that the latter acts as a spacing means as well as a partition. The cross-sectional area of each of the resulting passages 158 and 160 is greater than the cross-sectional area of each of the tubes in the vertical conveyer.

Reverting now to Fig. 11, the up chains of the vertical conveyer deposit their powder above the bottom plate 142, and consequently, the out chains of the horizontal conveyer pass through a mass or mound of powder indicated at 166. To held confine the powder from the up chains to the region 166, and to help guide any small amount of powder which may be carried around the spocket wheels to the down chain, I prefer to fill the opposite side of the transfer head with a block 168, said block being made of wood and having a sloping surface conforming to the peripheries of the sprocket wheels.

It has already been mentioned that the sprocket wheels 136 and 138 for the horizontal conveyer are somewhat larger in diameter than the sprocket wheels for the vertical conveyer. One reason for this is to provide an increased linear speed to help the two horizontal conveyers to take care of the delivery of the three vertical conveyers. Another reason is to help dispose the out chains of the horizontal conveyer near the bottom of the horizontal channel or tube 22, as is indicated by the chain 170 in Fig. 11. I have found that in the case of a horizontal conveyer, the chain should be disposed as low as possible within the tube, as this increases the frictional relation between the powder and the chain. In fact, the chain may even be adjusted to slide in the bottom of the tube, the points of contact with the tube being so small and so spaced in character, that no difficulty arises with rubbing or reaction of the powder.

Figure 12:
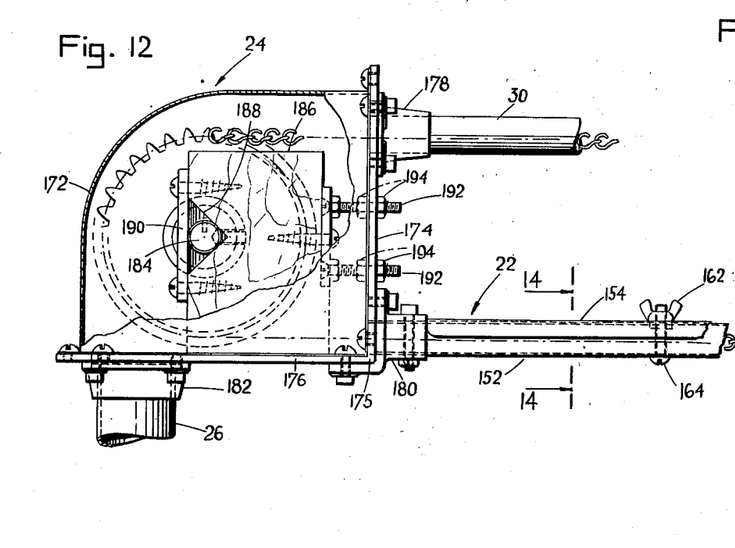
Fig. 12 is a partially sectioned elevation of the discharge head of the conveyer.
Figure 13:
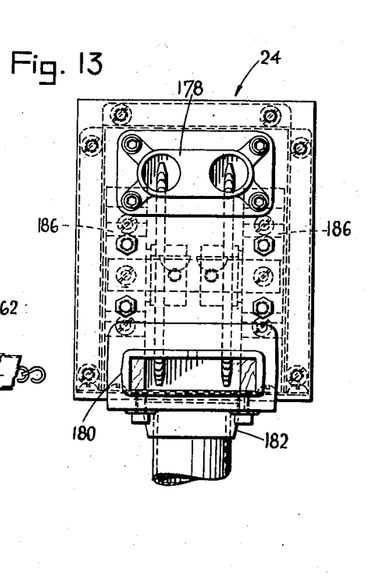
Fig. 13 is a side elevation of the same, with the conveyer tubes and chains removed.

Referring now to Figs. 12 and 13, the discharge head 24 comprises a housing 172 closed on its side and bottom surfaces by plates 174 and 176, which may be made of a single piece of metal bent at 175. This housing is preferably constructed of heavy-gauge sheet metal, and the connection with the top tubes 146 and 30 may be made by means of a flanged coupling 178, while the connection with the bottom tube or channel 22 may be made by means of another flanged connection 180, these connections being bolted to the plates 174 and 176. The discharge spout or nozzle 126 is connected to bottom plate 176 by means of a flanged coupling 182.

The sprocket wheels are carried by a shaft 184 which may be short enough to be housed within the discharge head. Shaft 184 is carried by wood blocks or bearings 186, and the actual contact between the shaft and bearings may, if desired, be minimized in area, as by using a V-shaped notch 188 closed by a plate 190. The blocks 186 are movably mounted within the housing, and may be adjusted by means of bolts 192 and nuts 194. This adjustment may be used to properly tension the horizontal conveyer chains. As before, any large change may be made by adding or removing links, but small changes may be made by the adjusting nuts. In this way, the chains may be tensioned until they approach or even lightly rest upon the bottom of the rectangular conduit 22.

It may be mentioned that a reasonably correct relation between the size of the chain and the size of the tube is necessary for successful and efficient operation of the conveyer. It will be evident that is a very small chain is used within a very large tube, the differential friction will favor movement of the chain through the powder, rather than movement of a solid rod or mass of powder through the tube. Moreover, the packing of the powder may be insufficient to cause movement of a solid rod of powder, unless the conveyer is preliminarily primed to a substantial height, and this in turn may be greater than the amount of elevation required from the conveyer.

As a specific example, I may refer to conveyers employing a one-half inch ladder chain within a tube having an internal diameter of 1⅛". The maximum transverse dimension of the commercial one-half inch ladder chain is $\tfrac{7}{16}$", thus providing a clearance of at least $\tfrac{1}{16}$ of an inch at each edge of the chain, and a much larger clearance at each face of the chain. Such a conveyer will rapidly prime itself by building up a column of powder 18 to 24 inches high, whereupon the the conveyer goes into full operation. I commonly employ such a conveyer for a height of eight feet, but have experimentally used the same at much greater heights, and probably there is no theoretical limit other than structural strength of the mechanical parts of the conveyer. The minimum height is, of course, limited by the necessary priming height.

I have also used a one-half inch ladder chain in a tube having an internal diameter of 1⅜". Such a conveyer operates successfully, but is already more difficult to prime. The priming takes longer, and sometimes must be aided by the addition of powder at the upper end of the tube. I have therefore not carried my experiments to tubes of still larger diameter, and surmise that a one-inch tube would probably represent a maximum limit. These dimensions refer to the vertical conveyer, it being possible to use a larger conduit for the same size chain in a horizontal conveyer.

Of course, smaller chains may be used with smaller tubes when only a limited quantity of powder is to be transferred. Theoretically, larger chains may be used with larger tubes, but at the moment, the one-half inch size is the largest commercially available size for ladder chain. It is more economical to use a number of chains in parallel, than to have a special chain made.

For the sake of long wear, the chain is preferably made of hardened piano wire, this being a commercially available product.

By means of the conveyers described above, I have successfully conveyed phenolic and urea molding powders directly from the barrels in which the molding compound is supplied, to an elevated hopper or mixer for my automatic molding machine disclosed in my co-pending application Serial Number 307,268 previously referred to. These conveyers have successfully handled molding powder of different coarseness or fineness ranging from material passed through a standard 12-mesh screen, to material passed through a standard 120-mesh screen. This indicates that the operation of the conveyer is not critical in respect to the grain size of the powder. No difficulty whatsoever has resulted from reaction or setting of the molding powder. The conveyer tubes are preferably smooth on the inside, and may even be preliminary polished, if desired, although I find that this refinement is not necessary, because the tubes rapidly become polished after a short time of operation.

It has already been pointed out that the drive for both conveyers is taken at the transfer head, but the reason for this has not been discussed in detail. With a vertical conveyer, it is best that the upwardly moving side of the chain be taut. It seems that if the upwardly moving chain is slack, it does not carry powder as well, for it tends to disturb or destroy the solid rod formation of powder which should be moving upwardly with the chain. To make the up-chain taut, it is merely necessary to drive a vertical conveyer at the top instead of at the bottom.

Now with a horizontal conveyer, the situation is different, for the powder is merely being carried along with the chain, and I find that it is better to employ a slack chain than a taut chain. In order to make the outwardly moving chain slack, it is merely necessary to drive the conveyer at the starting end. Both of these results are simultaneously fulfilled when the conveyers are driven at the intermediate or transfer head.

Although the horizontal chain runs along the bottom of the conduit, there is no curing or setting of powder. The reason for this is that there is no pressure exerted on the powder except for the comparatively light weight of the chain links themselves. In order to cure or react the powder, it must be pinched or squeezed, as for example, in a fitted bearing or a sliding surface under pressure.

Thus, if powder is pinched between the chain and a sprocket wheel under pressure, it may tend to cure and gather. This constitutes an additional advantage in driving a vertical conveyer at its upper end, for the chain and sprocket are not tight at the bottom. At the top the powder falls away from the chain before the chain reaches the point where it is pulled tightly against the sprocket wheel.

Similarly, it is beneficial to drive a horizontal conveyer at the starting end, for the chain is slack at the lower portions of the driven and driving sprocket wheels, hence there is no appreciable pinching of powder.

The conveyer may, of course, be operated at an angle. The conveyer here shown is made up of a vertical part and a horizontal part, because of installation requirements in which the conveyer must fit around an important part of the automatic molding machine, namely the powder-measuring apparatus. If it were not for this fact, a single angularly disposed conveyer might be used to transfer the powder between the starting and finishing points. When the conveyer is disposed at an angle, it may be treated as an upright conveyer if it is less than forty-five degrees away from the vertical. Such a conveyer should be driven at the top. The conveyer may be treated as a horizontal conveyer if it is less than forty-five degrees from the horizontal, and such a conveyer may be driven at the bottom.

One significant advantage of the present conveyer, particularly in connection with molding powder, is that the conveyer does not change the ratio of coarse particles to fine particles. The percentages or ratios of different degrees of coarse and fine powders has considerable significance in the plastics molding technology. The present conveyer has no surfaces to grind or pinch the powder. The chains and other parts of the conveyer are characterized by wide openings. While this is done primarily to avoid reaction and setting of the powder, an incidental result is that there is no grinding of coarse particles to fine particles, and consequently the ratio of coarse to fine remains unchanged.

In respect to Figs. 4 and 5, it may be mentioned that the omission of the down pipes for the conveyer is intended merely to simplify and clarify the theoretical operation of the conveyer. In actual practice, a little of the dust or powder adheres to the chain, so that there would be a loss of powder when leaving the down chain open, as is schematically indicated in Figs. 4 and 5. In all practical installations, I prefer full enclosure of the working parts of the conveyer.

It is believed that the construction and operation, as well as the many advantages of my improved powder conveyer, will be apparent from the foregoing detailed description thereof. It will also be apparent that while I have shown and described my invention in a preferred form, many changes and modifications may be made in the structure disclosed, without departing from the spirit of the invention as sought to be defined in the following claims.

I claim:

1. A vertical conveyer for elevating a thermosetting molding powder for the molding of plastics, said conveyer comprising a ladder chain the bent wire links of which are made of hardened piano wire and have open curves with substantially no sliding surfaces, sprocket wheels at the top and bottom of said conveyer for guiding said chain, a tube surrounding said chain between said sprocket wheels, said tube being larger than and providing a substantial clearance around the chain, but being small enough so that when primed a column of powder moves with the chain through the tube, instead of the chain moving through the powder, and means to drive the top sprocket wheel in order to keep the upwardly moving side of the chain taut and the downwardly moving side of the chain slack.

2. A vertical conveyer for elevating a thermosetting molding powder for the molding of plastics, said conveyer comprising a ladder chain the bent wire links of which are made of hardened piano wire and have open curves with substantially no sliding surfaces, sprocket wheels at the top and bottom of said conveyer for guiding and driving said chain, tubes surrounding said chain between said sprocket wheels, said tubes having an inside diameter of approximately 11/16" for a one-half inch ladder chain.

3. A vertical conveyer for elevating a powder, said conveyer comprising a chain, wheels at the top and bottom of said conveyer for guiding said chain, a tube surrounding said chain between said wheels, said tube being larger than and providing a substantial clearance around the chain, but being small enough so that when primed a column of powder moves with the chain through the tube, instead of the chain moving through the powder, a supply hopper leading to the up chain of the conveyer, a tray pivotally mounted in said hopper, a supply pipe for powder leading to said tray, means normally balancing said tray so that it is lowered by the weight of powder delivered thereon and thence to the hopper, and an alarm switch controlled by the position of the tray, the arrangement being such that the switch position is changed and the alarm sounded when there is no adequate supply of powder on the tray, thereby helping prevent such complete emptying of the hopper as might lead to loss of priming of the conveyer.

4. A vertical conveyer for elevating a thermosetting molding powder for the molding of plastics, said conveyer comprising a ladder chain the bent wire links of which are made of hardened piano wire and have open curves with substantially no sliding surfaces, sprocket wheels at the top and bottom of said conveyer for guiding and driving said chain, tubes surrounding said chain between said sprocket wheels, said tubes being larger than and providing a substantial clearance around the chain, but being small enough so that when primed a column of powder moves with the chain through the tube, instead of the chain moving through the powder, a supply hopper leading to the up chain of the conveyer, a tray pivotally mounted in said hopper, a supply pipe for molding powder leading to said tray, means normally balancing said tray so that it is lowered by the weight of molding powder delivered thereon and thence to the hopper, and an alarm switch controlled by the position of the tray, the arrangement being such that the switch position is changed and the alarm sounded when there is no adequate supply of powder on the tray, thereby helping prevent such complete emptying of the hopper as might lead to loss of priming of the conveyer.

5. A powder conveyer comprising a vertical conveyer and a horizontal conveyer connected at a suitable transfer head, the conveyers each comprising a chain made of bent wire links, wheels at the ends of said conveyers for guiding said chains, the adjacent wheels of the vertical and horizontal conveyers being mounted on a common shaft, tubes surrounding said chains between said wheels, said tubes being larger than and providing a substantial clearance around the chains, a supply hopper leading to a supply head at the lower end of said vertical conveyer, and a discharge head and spout at the end of said horizontal conveyer, all three of said heads being connected by the aforesaid tubes and forming an enclosed housing for the complete conveyer.

6. A conveyer for transferring a thermosetting molding powder for the molding of plastics, said conveyer comprising a vertical conveyer and a horizontal conveyer connected at a suitable transfer head, the conveyers each comprising a ladder chain the bent wire links of which are made of hardened piano wire and have open curves with substantially no sliding surfaces, sprocket wheels at the ends of said conveyers for guiding and driving said chains, the adjacent sprocket wheels of the vertical and horizontal conveyers being mounted on a common shaft, tubes surrounding said chain between said sprocket wheels, said tubes being larger than and providing a substantial clearance around the chains, a supply hopper leading to a supply head at the lower end of said vertical conveyer, and a discharge head and spout at the end of said horizontal conveyer, all three of said heads being connected by the aforesaid tubes and forming an enclosed housing for the complete conveyer.

7. A powder conveyer comprising a vertical conveyer and a horizontal conveyer connected at a suitable transfer head, the conveyers each comprising a ladder chain, sprocket wheels at the ends of said conveyers for guiding and driving said chains, the adjacent sprocket wheels of the vertical and horizontal conveyers being mounted on a common shaft, tubes surrounding said chains between said sprocket wheels, said tubes being larger than and providing a substantial clearance around the chains, a supply hopper leading to a supply head at the lower end of said vertical conveyer, a discharge head and spout at the end of said horizontal conveyer, all three of said heads being connected by the aforesaid tubes and forming an enclosed housing for the complete conveyer, and a sloping block filling the down side of the transfer head outside the sprocket wheels.

8. A powder conveyer comprising a vertical conveyer and a horizontal conveyer connected at a suitable transfer head, the conveyers each comprising a ladder chain, sprocket wheels at the ends of said conveyers for guiding and driving said chains, the adjacent sprocket wheels of the vertical and horizontal conveyers being mounted on a common shaft, tubes surrounding said chains between said sprocket wheels, said tubes being larger than and providing a substantial clearance around the chains, a supply hopper leading to a supply head at the lower end of said vertical conveyer, and a discharge head and spout at the end of said horizontal conveyer, all three of said heads being connected by the aforesaid tubes and forming an enclosed housing for the complete conveyer, the diameter of the sprocket wheels of the horizontal conveyer being slightly greater than that of the vertical conveyer, the outgoing chain of the horizontal conveyer running close to the bottom of the outgoing tube.

9. A conveyer for transferring a thermosetting molding powder for the molding of plastics, said conveyer comprising a vertical conveyer and a horizontal conveyer connected at a suitable transfer head, the vertical conveyer having a plurality of endless ladder chains, and the horizontal conveyer having a plurality of endless ladder chains disposed between the aforesaid chains, sprocket wheels at the ends of said conveyers for guiding and driving said chains, tubes surrounding said chains between said sprocket wheels, said tubes being larger than and providing a substantial clearance around the chains, a supply hopper leading to a supply head at the lower end of said vertical conveyer, a discharge head and spout at the end of said horizontal conveyer, said heads being connected by the aforesaid tubes and forming an enclosed housing for the complete conveyer, the supply head having a plurality of sprocket wheels on a common shaft and vertically adjustable bearings for said shaft, the discharge head having a plurality of sprocket wheels on a common shaft and horizontally adjustable bearings for said shaft, the transfer head having their combined number of sprocket wheels on a common shaft, and means outside of said transfer head for driving said shaft in order to drive both conveyers.

10. A conveyer for transferring a thermosetting molding powder for the molding of plastics, said conveyer comprising a vertical conveyer and a horizontal conveyer connected at a suitable transfer head, the vertical conveyer having three endless ladder chains, and the horizontal conveyer having two endless ladder chains disposed between the aforesaid chains, sprocket wheels at the ends of said conveyers for guiding and driving said chains, tubes surrounding said chains between said sprocket wheels, said tubes being larger than and providing a substantial clearance around the chains, a supply hopper leading to a supply head at the lower end of said vertical conveyer, a discharge head and a spout at the end of said horizontal conveyer, said heads being connected by the aforesaid tubes and forming an enclosed housing for the complete conveyer, the supply head having three sprocket wheels on a common shaft and vertically adjustable bearings for said shaft, the discharge head having two sprocket wheels on a common shaft and horizontally adjustable bearings for said shaft, the transfer head having five sprocket wheels on a common shaft, the lower or out tubes of the horizontal conveyer being rectangular in section and greater in area than the up tubes of the vertical conveyer, the diameter of the sprocket wheels of the horizontal conveyer being slightly greater than that of the vertical conveyer, the out chains running substantially along the bottom of the out tubes.

11. A conveyer for transferring a thermosetting molding powder for the molding of plastics, said conveyer comprising a vertical conveyer and a horizontal conveyer connected at a suitable transfer head, the vertical conveyer having three endless ladder chains, and the horizontal conveyer having two endless ladder chains disposed between the aforesaid three chains, said chains having links made of hardened piano wire and having open curves with substantially no sliding surfaces, sprocket wheels at the ends of said conveyors for guiding and driving said chains, tubes surrounding said chains between said sprocket wheels, said tubes being larger than and providing a substantial clearance around the chains, a supply hopper leading to a supply head at the lower end of said vertical conveyer, a discharge head and spout at the end of said horizontal conveyer, said heads being connected by the aforesaid tubes and forming an enclosed housing for the complete conveyer, the supply head having three sprocket wheels on a common shaft and vertically adjustable bearings for said shaft, the discharge head having two sprocket wheels on a common shaft and horizontally adjustable bearings for said shaft, the transfer head having five sprocket wheels on a common shaft, means outside of said transfer head for driving said shaft in order to drive both conveyers, a sloping block filling the down side of the transfer head outside the sprocket wheels, the lower or out tubes of the horizontal conveyer being rectangular in section and greater in area than the up tubes of the vertical conveyer, the diameter of the sprocket wheels of the horizontal conveyer being slightly greater than that of the vertical conveyer, and the out chains running substantially along the bottom of the out tubes.

12. A powder conveyer comprising a vertical conveyer and a horizontal conveyer connected at a suitable transfer head, the conveyers each comprising a chain made of bent wire links, wheels at the ends of said conveyers for guiding said chains, the adjacent wheels of the vertical and horizontal conveyers being mounted on a common shaft, tubes surrounding said chains between said wheels, said tubes being larger than and providing a substantial clearance around the chains, a supply hopper leading to a supply head at the lower end of said vertical conveyer, a discharge head and spout at the end of said horizontal conveyer, all three of said heads being connected by the aforesaid tubes and forming an enclosed housing for the complete conveyer, and motor means operatively connected to said common shaft for rotating the same in proper direction to keep the delivery side of the vertical conveyer taut, and the delivery side of the horizontal conveyer slack.

13. A powder conveyer comprising a vertical conveyer and a horizontal conveyer connected at a suitable transfer head, the conveyers each comprising a chain made of bent wire links, wheels at the ends of said conveyers for guiding said chains, the adjacent wheels of the vertical and horizontal conveyers being mounted on a common shaft, vertical and horizontal tubes surrounding said chains between said wheels, said tubes being larger than and providing a substantial clearance around the chains, the vertical delivery tube being cylindrical, and the horizontal delivery tube being rectangular in section and greater in sectional area than the vertical delivery tube, a supply hopper leading to a supply head at the lower end of said vertical conveyer, and a discharge head and spout at the end of said horizontal conveyer, all three of said heads being connected by the aforesaid tubes and forming an enclosed housing for the complete conveyer.

14. A conveyer for transferring a thermosetting molding powder for the molding of plastics, said conveyer comprising a vertical conveyer and a horizontal conveyer connected at a suitable transfer head, the vertical conveyer having a plurality of endless ladder chains, and the horizontal conveyer having a plurality of endless ladder chains disposed between the aforesaid chains, sprocket wheels at the ends of said conveyers for guiding and driving said chains, tubes surrounding said chains between said sprocket wheels, said tubes being larger than and providing a substantial clearance around the chains, a supply hopper leading to a supply head at the lower end of said vertical conveyer, a discharge head and spout at the end of said horizontal conveyer, said heads being connected by the aforesaid tubes and forming an enclosed housing for the complete conveyer, the supply head having a plurality of sprocket wheels on a common shaft, the discharge head having a plurality of sprocket wheels on a common shaft, the transfer head having their combined number of sprocket wheels on a common shaft, and means outside of said transfer head for driving said shaft in order to drive both conveyers.

15. A conveyer for transferring a thermosetting molding powder for the molding of plastics, said conveyer comprising a vertical conveyer and a horizontal conveyer connected at a suitable transfer head, the vertical conveyer having three endless ladder chains, and the horizontal conveyer having two endless ladder chains disposed between the aforesaid chains, sprocket wheels at the ends of said conveyers for guiding and driving said chains, tubes surrounding said chains between said sprocket wheels, said tubes being larger than and providing a substantial clearance around the chains, a supply hopper leading to a supply head at the lower end of said vertical conveyer, a discharge head and spout at the end of said horizontal conveyer said heads being connected by the aforesaid tubes and forming an enclosed housing for the complete conveyer, the supply head having three sprocket wheels on a common shaft, the discharge head having two sprocket wheels on a common shaft, the transfer head having five sprocket wheels on a common shaft, the lower or out tubes of the horizontal conveyer being rectangular in section and greater in area than the up tubes of the vertical conveyer, the diameter of the sprocket wheels of the horizontal conveyer being slightly greater than that of the vertical conveyer, the out chains running substantially along the bottom of the out tubes.

16. A conveyer for transferring a thermosetting molding powder for the molding of plastics, said conveyer comprising a vertical conveyer and a horizontal conveyer connected at a suitable transfer head, the vertical conveyer having three endless ladder chains, and the horizontal conveyer having two endless ladder chains disposed between the aforesaid three chains, said chains having links made of hardened piano wire and having open curves with substantially no sliding surfaces, sprocket wheels at the ends of said conveyers for guiding and driving said chains, tubes surrounding said chains between said sprocket wheels, said tubes being larger than and providing a substantial clearance around the chains, a supply hopper leading to a supply head at the lower end of said vertical conveyer, a discharge head and spout at the end of said horizontal conveyer, said heads being connected by the aforesaid tubes and forming an enclosed housing for the complete conveyer, the supply head having three sprocket wheels on a common shaft, the discharge head having two sprocket wheels on a common shaft, the transfer head having five sprocket wheels on a common shaft, means outside of said transfer head for driving said shaft in order to drive both conveyers, a sloping block filling the down side of the transfer head outside the sprocket wheels, the lower or out tubes of the horizontal conveyer being rectangular in section and greater in area than the up tubes of the vertical conveyer, the diameter of the sprocket wheels of the horizontal conveyer being slightly greater than that of the vertical conveyer, and the out chains running substantially along the bottom of the out tubes.

GORDON B. SAYRE.